(12) United States Patent
Tanida et al.

(10) Patent No.: US 8,393,087 B2
(45) Date of Patent: Mar. 12, 2013

(54) DIMENSION MEASURING DEVICE FOR LONG MATERIAL

(75) Inventors: Mutsumi Tanida, Osaka (JP); Takashi Matsuura, Osaka (JP); Yasuhisa Kasa, Wakayami (JP)

(73) Assignee: Nippon Steel & Sumitomo Metal Corporation, Tokyo (JP)

( * ) Notice: Subject to any disclaimer, the term of this patent is extended or adjusted under 35 U.S.C. 154(b) by 191 days.

(21) Appl. No.: 13/056,317

(22) PCT Filed: Jul. 10, 2009

(86) PCT No.: PCT/JP2009/062577
§ 371 (c)(1),
(2), (4) Date: Mar. 1, 2011

(87) PCT Pub. No.: WO2010/013593
PCT Pub. Date: Feb. 4, 2010

(65) Prior Publication Data
US 2011/0146095 A1 Jun. 23, 2011

(30) Foreign Application Priority Data

Jul. 30, 2008 (JP) .................................. 2008-195759

(51) Int. Cl.
*G01B 3/00* (2006.01)
*G01B 5/08* (2006.01)
(52) U.S. Cl. ........................................ 33/555.1; 33/549
(58) Field of Classification Search .................. 33/555.1, 33/555.2, 555.3, 555.4, 549, 550, 551, 543, 33/556, 503
See application file for complete search history.

(56) References Cited

U.S. PATENT DOCUMENTS

| 5,465,496 | A * | 11/1995 | Axon .............................. 33/522 |
| 6,954,991 | B2 * | 10/2005 | Akatsuka et al. ............... 33/550 |
| 7,310,890 | B2 * | 12/2007 | Cattaneo et al. ................ 33/543 |
| 7,707,865 | B2 * | 5/2010 | Sasaki .............................. 72/9.2 |
| 2005/0050745 | A1* | 3/2005 | Akatsuka et al. ............... 33/549 |
| 2011/0146095 | A1* | 6/2011 | Tanida et al. ................ 33/555.1 |
| 2011/0164244 | A1* | 7/2011 | Honda et al. .................... 356/72 |

FOREIGN PATENT DOCUMENTS

WO    WO 2010013593 A1 *    2/2010

\* cited by examiner

*Primary Examiner* — Yaritza Guadalupe-McCall
(74) *Attorney, Agent, or Firm* — Clark & Brody

(57) ABSTRACT

A dimension measuring device 100 in accordance with the present invention includes an end face following mechanism 1 that butts against an end face E of a long material, a dimension measuring mechanism 2 for measuring the dimensions of the long material, and a pushingly moving mechanism 3 for pushingly moving the end face following mechanism toward the end face of the long material. The end face following mechanism includes a plurality of contact sensors for detecting a contact state, and is turnable around two axes intersecting at right angles with each other. The pushingly moving mechanism pushingly moves the end face following mechanism into the state in which the plurality of contact sensors detect that the end face following mechanism butts against the end face of the long material. The dimension measuring mechanism is pushingly moved integrally and is turnable integrally with the end face following mechanism, and measures the dimensions of the long material when it is detected, by the plurality of contact sensors, that the end face following mechanism butts against the end face of the long material.

4 Claims, 6 Drawing Sheets

DIMENSION MEASURING DEVICE FOR LONG MATERIAL

TECHNICAL FIELD

The present invention relates to a dimension measuring device capable of accurately measuring the dimensions of a long material such as a pipe or tube that has been bent in the end portion thereof. Hereinafter, "pipe or tube" is referred to as "pipe" when deemed appropriate.

BACKGROUND ART

Pipes such as Oil Country Tubular Goods (OCTG) and pipes for pipeline are often used in a connected state at the end portions thereof by a joint part consisting of a so-called pin joint and box joint. Specifically, the end portion of the outer peripheral surface of the pipe is threaded and beveled to form the pin joint. A pair of pin joints formed on a pair of pipes are fastened to the box joint threaded and beveled on the inner peripheral surface thereof, whereby the pair of pipes are connected to each other. If the pin joint has a low dimensional accuracy, the pin joint and the box joint in a fastened state loosen, and therefore, pipes may be disconnected and drop, or in the case of OCTG and pipes for pipeline in which a fluid flows, the fluid may leak from the joint part. For this reason, the requirements for dimensional accuracy and quality assurance level of the pin joint formed in the end portion of the pipe have become severe year by year.

In the dimensional inspection of the pin joint, at present, dimensional measurement is made manually by using a special-purpose measuring instrument to check whether or not the accuracy requirements are satisfied. As the shape of pin joint becomes more complex, the number of dimensional items to be inspected increases, so that much labor and long inspection time are required. Therefore, for a special joint having a complex shape among other pin joints, which is used frequently as the service environment has become harsher in recent years, it has become impossible to perform one hundred percent dimensional inspection on a highly efficient production line for mass-production of pipes.

Therefore, for the special joint of the mass-produced pipe, as a dimensional inspection method consistent with the production efficiency, sampling inspection at fixed frequencies is generally adopted. The pin joint of pipe is generally fabricated by using a CNC lathe. Since the CNC lathe is reliabile for working accuracy, sampling inspection is acceptable on the assumption that only a slow dimensional change caused by the wear of a tool equipped on the CNC lathe occurs. The idea is that if an improper dimension is found in the sampling inspection, the pin joints of pipes included in those that satisfied accuracy requirements in the last sampling inspection before the sampling inspection in which the improper dimension has been found are considered as accepted products to assure the quality as a whole.

Actually, however, it is thought that in addition to the slow dimensional change caused by the wear of the tool, which can be found in sampling inspection, other dimensional changes may be induced by other factors.

Therefore, for the pin joint of pipe, especially the special joint having a complex shape, there has been a need for the development of an automatic dimension measuring device that can take measurements at a high speed and enables one hundred percent dimensional inspection. Conventionally, as a device for automatically measuring the dimension of a thread part of the pin joint and the like, devices described, for example, in JP55-113907A (Patent Literature 1), JP58-205809A (Patent Literature 2), JP61-25001A (Patent Literature 3), and JP2001-293619A (Patent Literature 4) have been proposed.

The dimensions to be inspected of the pin joint of pipe are mainly dimensions such as an outside diameter at a predetermined position in the longitudinal direction with the end face in the longitudinal direction of pipe being a reference. In other words, the dimensions to be inspected of the pin joint of pipe are mainly dimensions at a predetermined position in the direction perpendicular to a plane (reference plane) passing through the endmost point in the longitudinal direction of pipe of the points constituting the pipe end face. As these dimensions, for example, a seal diameter and a thread diameter are cited. As shown in FIG. 6A, the seal diameter is an outside diameter SD of a seal part S at a position separate by a predefined distance SL in the direction perpendicular to a reference plane ES passing through endmost points E1 constituting an end face E of a pipe P. Also, the thread diameter is an outside diameter (an outside diameter on an imaginary line V passing through the tops of threads) TD of a thread part T at a position separate by a predefined distance TL in the direction perpendicular to the reference plane ES of the pipe P.

Unfortunately, a long pipe is generally bent in the end portion thereof. In the case where the pipe has been bent, even if the pipe is placed in such a manner that the longitudinal direction is horizontal in the central portion in the longitudinal direction of the pipe, the direction of the reference plane of the pipe does not coincide with the vertical direction, and tilts with respect to the vertical direction according to the degree and direction of the bend. Therefore, if the dimensions of the pin joint are measured on the assumption that the direction of the reference plane of the pipe is the vertical direction, a measurement error occurs. For example, as shown in FIG. 6B, if the seal diameter is measured on the assumption that the direction of the reference plane of the pipe coincides with the vertical direction (that is, the reference plane of the pipe is ES'), a distance SD' in the vertical direction at a point separate from the reference plane ES' by the distance SL in the direction perpendicular to the reference plane ES' (in the horizontal direction) is measured as the seal diameter, so that a measurement error with respect to the actual seal diameter SD (FIG. 6A) occurs. Similarly, a distance TD' in the vertical direction at a point separate from the reference plane ES' by the distance TL in the direction perpendicular to the reference plane ES' (in the horizontal direction) is measured as the thread diameter, so that a measurement error with respect to the actual thread diameter TD (FIG. 6A) occurs. Therefore, in order to accurately measure the dimensions, such as the seal diameter and the thread diameter, at the predetermined positions in the direction perpendicular to the reference plane of pipe, it is important to accurately grasp the direction and position of the reference plane of the pipe.

To reduce the above-described measurement error, the aforementioned special-purpose measuring instrument includes a member having a contact surface that is butted against the end face (the endmost point) of pipe, and a contactor for measuring the dimensions of pipe at predetermined positions in the direction perpendicular to the contact surface of this member. The dimensional measurement is made manually by using the contactor in the state in which the direction and position of the reference plane have been grasped by causing the contact surface of the member to butt against the end face (the endmost point) of pipe.

Unfortunately, in the conventional automatic dimension measuring devices described in Patent Documents 1 to 4, no proposal has been made concerning the accurate grasping of the direction of the reference plane of pipe, and the dimensional measuring has been made on the assumption that the pipe end portion has not been bent. Therefore, depending on the degree of bend of the pipe, a large measurement error may occur, which presents a problem that the dimension measuring device cannot sufficiently assure the ever tightened dimensional accuracy of pin joint.

SUMMARY OF INVENTION

The present invention has been made to solve the problems with the prior art, and accordingly an objective thereof is to provide a dimension measuring device capable of automatically measuring the dimensions of a long material such as a pipe, which may be bent in the end portion thereof, with high accuracy.

As means for grasping the direction and position of the reference plane of the long material (the plane passing through the endmost point in the longitudinal direction of the long material of the points constituting the end face in the longitudinal direction of the long material), it is conceivable that the shape of the end face is measured by using optical means such as a laser range finder, and the endmost point is detected from the obtained end face shape to grasp the direction and position of the reference plane passing through the endmost point. However, in the case where the long material is a pipe having a small wall thickness, since the dimension in the radial direction of the end face is small in a cross section passing through the center axis of pipe, when the cross-sectional shape in the radial direction of the end face is measured by using the optical means, there arises a need to grasp an approximate position, at which the end face exists, by any means in advance. Also, even if the approximate position at which the end face exists could be grasped, in the case where the cross-sectional shape in the radial direction of the end face is not flat but curved as shown in FIGS. 6A and 6B, much time is required to detect the endmost point. To grasp the direction and position of the reference plane, it is necessary to detect at least three endmost points constituting the end face and to three-dimensionally calculate the reference plane passing through the at least three endmost points. Therefore, very long time is required to grasp the direction and position of the reference plane, and the pipe production efficiency is decreased.

Accordingly, the present inventors paid attention to the fact that an end face following mechanism that butts against the end face in the longitudinal direction of the long material is used as means for grasping the position and direction of the reference plane without decreasing the production efficiency of long material. The present inventors carried out studies earnestly, and resultantly conceived of an end face following mechanism that includes a plurality of (three or more) contact sensors, which are arranged along one plane to detect the contact state, on the side where the end face following mechanism butts against the end face in the longitudinal direction of the long material, and is turnable around at least two axes intersecting at right angles with the direction normal to the plane and intersecting at right angles with each other. This end face following mechanism is pushingly moved toward the end face in the longitudinal direction of the long material and is butted against the end face, whereby in the case where the long material has been bent in the end portion thereof, the end face following mechanism turns following the end face in the longitudinal direction regardless of the direction of the bend. Also, if the end face following mechanism is pushingly moved into the state in which at least three contact sensors of the plurality of contact sensors detect that the end face following mechanism butts against the end face (the endmost point of end face) in the longitudinal direction of long material, the end face following mechanism can be butted surely against the end face. The present inventors came up with the idea that if the configuration is made such that a dimension measuring mechanism for measuring the dimensions of the long material can be pushingly moved integrally and be turned integrally with the end face following mechanism, even in the case where the long material has been bent in the end portion thereof, by pushingly moving the end face following mechanism toward the end face in the longitudinal direction of the long material and causing the mechanism to butt against the end face, the dimension measuring mechanism is also pushingly moved integrally with the end face following mechanism, and turns integrally with the end face following mechanism according to the bend of the end portion, so that the dimensions at the predetermined positions in the direction perpendicular to the reference plane can be measured with high accuracy.

The present invention was completed on the basis of the knowledge of the present inventors. That is, the present invention provides a dimension measuring device for a long material, comprising: an end face following mechanism which butts against the end face in the longitudinal direction of the long material; a dimension measuring mechanism which is connected to the end face following mechanism to measure the dimension of the long material; and a pushingly moving mechanism for pushingly moving the end face following mechanism toward the end face in the longitudinal direction of the long material, wherein the end face following mechanism includes a plurality of (three or more) contact sensors, which are arranged along one plane to detect a contact state, on the side where the end face following mechanism butts against the end face in the longitudinal direction of the long material, and is turnable around at least two axes intersecting at right angles with the direction normal to the plane and intersecting at right angles with each other; the pushingly moving mechanism pushingly moves the end face following mechanism into the state in which at least three contact sensors of the plurality of contact sensors detect that the end face following mechanism butts against the end face in the longitudinal direction of the long material; and the dimension measuring mechanism is pushingly moved integrally and is turnable integrally with the end face following mechanism, and measures the dimension of the long material when it is detected, by at least three contact sensors of the plurality of contact sensors, that the end face following mechanism butts against the end face in the longitudinal direction of the long material.

According to the above-described invention, the end face following mechanism is pushingly moved toward the end face in the longitudinal direction of the long material by the pushingly moving mechanism, and at least three contact sensors of the end face following mechanism are butted against the end face, whereby even if the end portion of the long material has been bent, the direction and position of the reference plane of the long material (the plane passing through the endmost point in the longitudinal direction of the long material of the points constituting the end face in the longitudinal direction of the long material) can reliably be grasped. By the dimension measuring mechanism that is pushingly moved integrally and is turned integrally with the end face following mechanism according to the direction and position of the reference plane of the long material, the dimension at a predetermined position in the direction perpendicular to the reference plane of the long material can be measured automatically with high accuracy.

As the contact sensor, for example, a pressure sensing contact sensor for detecting the contact state according to the pressure applied at the contact time can also be used. However, in order to detect the contact state by using the pressure sensing contact sensor, the end face following mechanism must be pushingly moved with a relatively large pushingly moving force. Therefore, there is a fear that, depending on the material quality and the like of long material, the end face is deformed, which leads to a decrease in dimensional measurement accuracy. Also, for the pressure sensing contact sensor, since some degree of fluctuation range exists in the detection of the contact state, when the contact sensor detects that the end face following mechanism butts against the end face in the longitudinal direction of the long material, an error caused by the fluctuation range occurs, which may lead to a decrease in dimensional measurement accuracy.

In the case where the long material is formed of a conductive material, in order to suppress the fear that the deformation of long material and the detection error of contact state may occur, it is preferable that the contact sensor includes a pair of electrodes, and a contact state is detected by the presence or absence of a current flowing between the pair of electrodes.

According to the above-described preferred configuration, if the end face of long material butts against the pair of electrodes that the contact sensor has, a current flows from one electrode to the other electrode via the end face of long material, and if the end face of long material does not butt against the pair of electrodes, no current flows between the pair of electrodes. Therefore, the end face following mechanism has only to be pushingly moved with a relatively small pushingly moving force, and the fluctuation range in the detection of the contact state is narrow, so that the contact state can be detected accurately depending on the presence or absence of a current flowing between the pair of electrodes. Therefore, the dimensional measurement accuracy of long material can be enhanced further.

Preferably, the pushingly moving mechanism can regulate a pushingly moving force for pushingly moving the end face following mechanism.

According to the above-described preferred configuration, since the pushingly moving force for pushingly moving the end face following mechanism can be regulated, a proper pushingly moving force can be provided according to the material quality and the like of long material, and the fear that an excessively large pushingly moving force is applied to the end face of long material to deform the end face can be decreased further. Therefore, the dimensional measurement accuracy of long material can be enhanced further.

Preferably, at least one mechanism of the end face following mechanism, the dimension measuring mechanism, and the pushingly moving mechanism includes a vibration sensor for detecting a vibrating state; and the dimension measuring mechanism measures the dimension of the long material in the case where the vibration detected by the vibration sensor has a magnitude not greater than a predetermined magnitude.

According to the above-described preferred configuration, because the dimension of the long material is measured in the case where the vibration detected by the vibration sensor has a magnitude not greater than a predetermined magnitude, the measurement error caused by the vibration is reduced, and therefore the dimensional measurement accuracy of long material can be enhanced further.

As described above, according to the present invention, the dimensions of the long material such as a pipe that has been bent in the end portion thereof can be measured automatically with high accuracy.

DESCRIPTION OF EMBODIMENTS

One embodiment of a dimension measuring device for a long material in accordance with the present invention will now be described with reference to the accompanying drawings. In this description, explanation is given by taking, as an example, the case where the long material is a pipe formed of a conductive material, and a seal diameter and a thread diameter of a pin joint formed in the end portion of the pipe are measured.

A. Entire Configuration

Figure 1:
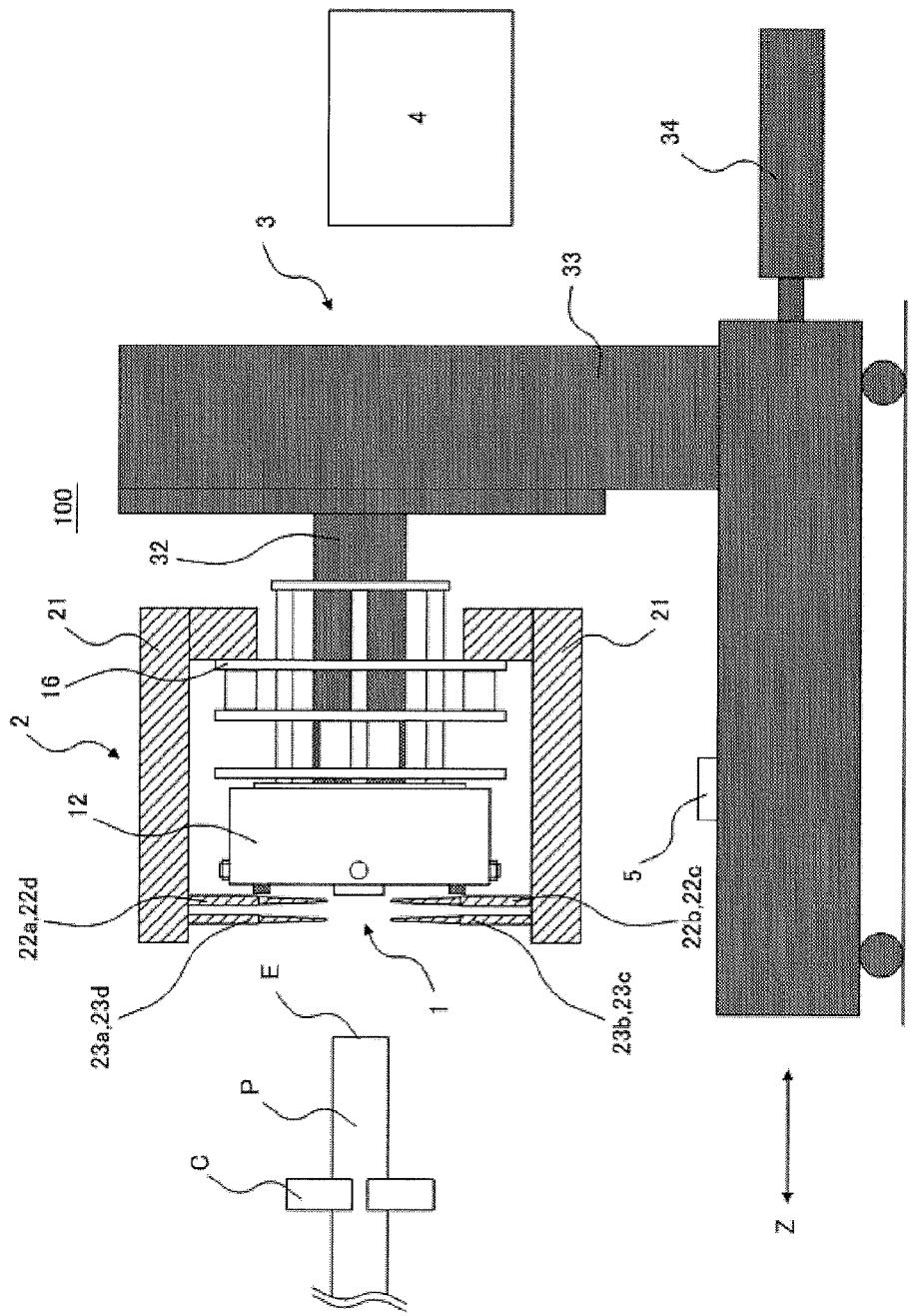
FIG. 1 is a side view showing a general configuration of a dimension measuring device for a long material in accordance with one embodiment of the present invention.
Figure 2B:
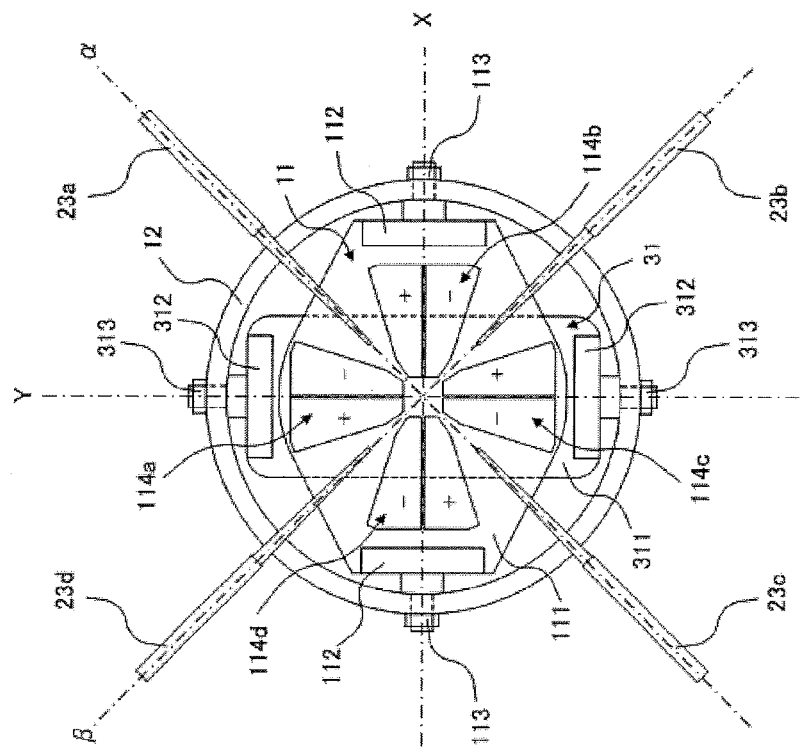
FIGS. 2A and 2B are views showing in detail an end face following mechanism, a dimension measuring mechanism, and a part of a pushingly moving mechanism equipped on the dimension measuring device shown in FIG. 1.
Figure 2A:
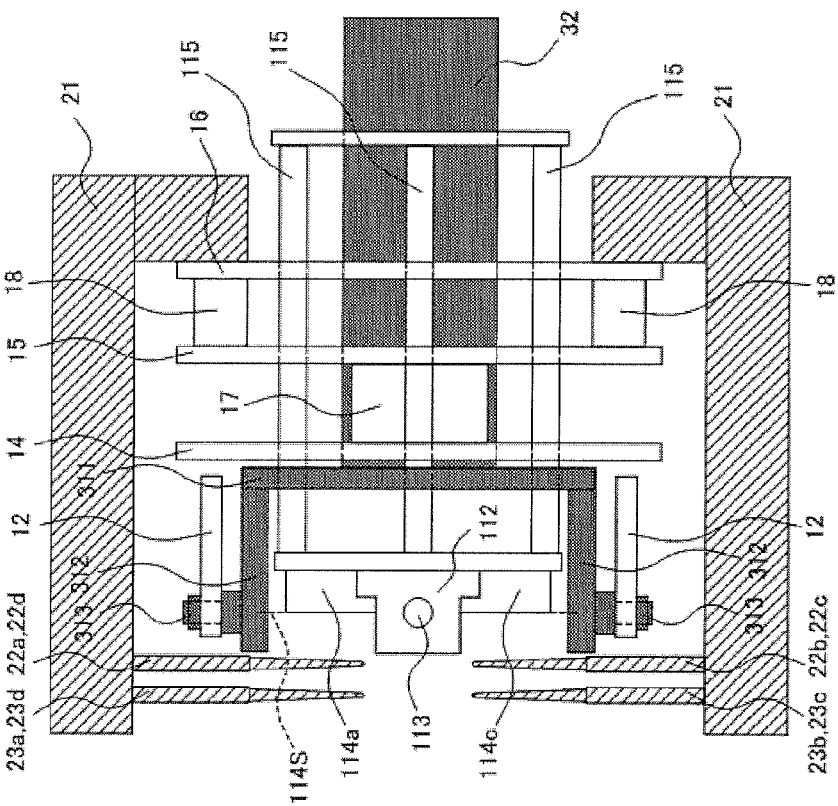

FIG. 1 is a side view showing a general configuration of a dimension measuring device in accordance with one embodiment of the present invention. FIGS. 2A and 2B are views showing in detail an end face following mechanism, a dimension measuring mechanism, and a part of a pushingly moving mechanism equipped on the dimension measuring device shown in FIG. 1, FIG. 2A being a partially sectioned side view, and FIG. 2B being a front view (a view viewed from the Z-axis direction shown in FIG. 1).

As shown in FIG. 1, a dimension measuring device 100 in accordance with this embodiment includes an end face following mechanism 1 that butts against an end face E in the longitudinal direction of a pipe P restrained by a chuck member C, a dimension measuring mechanism 2 which is connected to the end face following mechanism 1 to measure the dimensions (in this embodiment, the seal diameter and the thread diameter) of the pipe P, and a pushingly moving mechanism 3 for pushingly moving the end face following mechanism 1 toward the end face E in the longitudinal direction of the pipe P. Also, the dimension measuring device 100 includes a control unit 4 for drivingly controlling the end face following mechanism 1, the dimension measuring mechanism 2, and the pushingly moving mechanism 3. Further, the dimension measuring device 100 includes, as a preferred configuration, a vibration sensor 5 such as an accelerometer. In FIGS. 1 and 2A, the dimension measuring mechanism 2 is shown by oblique hatching, and the pushingly moving mechanism 3 is shown by gray color hatching. Also, actually, electric wiring or the like is connected between the control unit 4 and the mechanisms 1 to 3 and the vibration sensor 5; however, for convenience, the illustration of the electric wiring or the like is omitted in the figures.

B. End Face Following Mechanism

As shown in FIG. 1 or FIGS. 2A and 2B, the end face following mechanism 1 includes on the side where it butts against the end face E in the longitudinal direction of the pipe P three or more (four in this embodiment) contact sensors 114a, 114b, 114c, and 114d, which are arranged along one plane 114S (arranged so that the contact surface contacting the end face E of the pipe P exists on the plane 114S) to detect the contact state, and is configured so as to be turnable around two axes (X axis and Y axis) that intersect at right angles with the direction normal to the plane 114S (the Z-axis direction) and intersect at right angles with each other. Hereunder, a further specific configuration of the end face following mechanism 1 in accordance with this embodiment is explained.

The end face following mechanism 1 in accordance with this embodiment includes an end face following part 11, a cylindrical part 12, a first flat plate part 14, a second flat plate part 15, a third flat plate part 16, a first linear stage 17, and second linear stages 18.

B-1 End Face Following Part

The end face following part 11 includes a flat plate member 111, a pair of projecting members 112 provided so as to project in the Z-axis direction from both end portions in the X-axis direction of the flat plate member 111, and a pair of shaft members 113 that connect the pair of projecting members 112 to the cylindrical part 12. The end face following part 11 is connected to the cylindrical part 12 by the pair of shaft members 113 so as to be turnable around the X axis with respect to the cylindrical part 12. Specifically, the pair of projecting members 112 are connected to the cylindrical part 12 via the pair of shaft members 113 so as to be turnable around the X axis with respect to the cylindrical part 12. Also, the end face following part 11 includes the four contact sensors 114a, 114b, 114c, and 114d arranged radially on the surface on the side on which the flat plate member 111 butts against the end face E of the pipe P. Further, the end face following part 11 includes a plurality of rod-shaped members 115 that are connected to the surface of the flat plate member 111 on the side opposite to the side on which the contact sensors 114a to 114d are arranged and extend in the Z-axis direction.

When the contact sensors 114a to 114d of the end face following part 11 having the above-described configuration are pushingly moved toward the end face E of the pipe P, and any of the contact sensors 114a to 114d butts against the end face E of the pipe P, the end face following part 11 turns around the X axis according to the direction of the reference plane of the pipe P (the plane passing through the endmost point in the longitudinal direction of the points constituting the end face E of the pipe P). That is, in the case where a reaction force that turns any of the contact sensors 114a to 114d around the X axis is applied from the end face E of the pipe P to it, the reaction force acts on all of the contact sensors 114a to 114d, the flat plate member 111 to which the contact sensors 114a to 114d are attached, the projecting members 112 and the rod-shaped members 115 attached to the flat plate member 111, and the shaft members 113 attached to the projecting members 112, and these elements turn integrally around the X axis.

In this embodiment, as a preferred configuration, each of the contact sensors 114a to 114d includes a pair of electrodes (in FIG. 2B, a positive electrode indicated by "+" and a negative electrode indicated by "−"), and a contact state is detected by the presence or absence of a current flowing between the pair of electrodes. Specifically, a voltage is supplied from the control unit 4 to the pair of electrodes, and the contact state is detected by utilizing a phenomenon that if the end face E of the pipe P butts against the pair of electrodes, current flows from the positive electrode to the negative electrode via the end face E of the pipe P, and if the end face E of the pipe P does not butt against the pair of electrodes, current does not flow between the pair of electrodes. The contact sensors 114a to 114d are brought into contact repeatedly with the end face E of the pipe P by the repetition of dimensional measurement made by using the dimension measuring device 100, and slidingly move along the end face E of the pipe P from the state in which at least one of the contact sensors 114a to 114d first butts against the end face E of the pipe P until the state in which at least three of the contact sensors butt against the end face E of the pipe P (as described later, the state in which the dimensions of the pipe P are measured) is established. Therefore, from the viewpoints of preventing the end face E of the pipe P from being roughened or deformed and preventing the dimensional measurement accuracy from being reduced by the adhesion of the material for the pipe P, it is desirable to form the electrode from a material that has electric conductivity and wear resistance, has a small surface roughness, and is excellent in adhesion resistance. As such an electrode, for example, an electrode, in which the surface of a metal material having a high hardness (the surface on the side of contacting the end face E of the pipe P) is coated with a metallic compound such as TiN that is excellent in electric conductivity, wear resistance, and adhesion resistance and is capable of reducing the surface roughness, can be cited.

B-2 Cylindrical Part

The cylindrical part 12 (in FIG. 2A, shown by cross section) is disposed on the outside of the end face following part 11 and a support part 31 of the later-described pushingly moving mechanism 3 so as to surround the end face following part 11 and a part of the support part 31. As described above, the cylindrical part 12 is connected to the end face following part 11 by the pair of shaft members 113 so that the end face following part 11 can turn around the X axis. Also, the cylindrical part 12 is connected to the support part 31 by a pair of shaft members 313 so that the support part 31 can turn around the Y axis.

By the cylindrical part 12 having the above-described configuration, the end face following part 11 is made turnable around the Y axis. That is, when the contact sensors 114a to 114d of the end face following part 11 are pushingly moved toward the end face E of the pipe P, and the end face E of the pipe P butts against any of the contact sensors 114a to 114d, the end face following part 11 turns around the Y axis according to the direction of the reference plane of the pipe P. Specifically, in the case where a reaction force that turns any of the contact sensors 114a to 114d around the Y axis is applied from the end face E of the pipe P to it, the reaction force also acts on the flat plate member 111, the projecting members 112 and the shaft members 113, and also acts on the cylindrical part 12 through the shaft members 113. Thereby, the cylindrical part 12 is turned around the Y axis with respect to the support part 31. When the cylindrical part 12 is turned around the Y axis, the end face following part 11 connected to the cylindrical part 12 by the shaft members 113 is also turned around the Y axis integrally with the cylindrical part 12. Also, since the support part 31 is pushingly moved in the horizontal direction (the Z-axis direction in the state shown in FIG. 1), the cylindrical part 12 connected to the support part 31 is pushingly moved in the horizontal direction, and the end face following part 11 connected to the cylindrical part 12 is also pushingly moved in the horizontal direction.

B-3 End Face Following Mechanism and Other Configurations

The first flat plate part 14 is fixedly connected to the rod-shaped members 115. Specifically, the first flat plate part 14 has through holes formed in portions through which the rod-shaped members 115 pass. The dimension of each of the through holes is substantially equivalent to the cross-sectional dimension of the rod-shaped member 115, and the rod-shaped member 115 is fitted closely in the through hole. Since the first flat plate part 14 is fixedly connected to the rod-shaped members 115 in this manner, when the end face following part 11 turns around the X axis and the Y axis, the first flat plate part 14 also turns integrally with the end face following part 11. Also, since the end face following part 11 is pushingly moved in the horizontal direction, the first flat plate part 14 is also pushingly moved integrally with the end face following part 11. The first flat plate part 14 also has a through hole formed in a portion through which a shaft part 32 of the pushingly moving mechanism 3, described later, passes. As described above, when the end face following part 11 turns around the X axis and the Y axis, the first flat plate part 14 also turns integrally with the end face following part 11. Therefore, the through hole (the through hole formed in the portion through which the shaft part 32 passes) has a size corresponding to the turning range of the first flat plate part 14 so that the turning of the first flat plate part 14 is not subjected to interference.

The second flat plate part 15 is connected to the first flat plate part 14 by the first linear stage 17 so as to be movable in the α-axis direction with respect to the first flat plate part 14. The α axis is an axis intersecting at right angles with the direction normal to the plane 114S (the Z-axis direction). The first linear stage 17 is driven by a control signal sent from the control unit 4. Since the first flat plate part 14 turns around the X axis and the Y axis integrally with the end face following part 11 as described above, the second flat plate part 15 connected to the first flat plate part 14 also turns integrally with the end face following part 11. Also, since the end face following part 11 is pushingly moved in the horizontal direction, the second flat plate part 15 is also pushingly moved integrally with the end face following part 11. The second flat plate part 15 has through holes formed in portions through which the rod-shaped members 115 of the end face following part 11 pass. As described above, the second flat plate part 15 is made movable in the α-axis direction with respect to the first flat plate part 14 by the first linear stage 17. Therefore, each of the through holes has a size corresponding to the moving range of the second flat plate part 15 so that the movement in the α-axis direction of the second flat plate part 15 is not subjected to interference. Also, the second flat plate part 15 has a through hole formed in a portion through which the shaft part 32 of the pushingly moving mechanism 3, described later, passes. When the end face following part 11 turns around the X axis and the Y axis as described above, the second flat plate part 15 also turns integrally with the end face following part 11. Also, as described above, the second flat plate part 15 is made movable in the α-axis direction with respect to the first flat plate part 14 by the first linear stage 17. Therefore, the through hole (the through hole formed in the portion through which the shaft part 32 passes) has a size corresponding to the turning range and the moving range of the second flat plate part 15 so that the turn and the movement in the α-axis direction of the second flat plate part 15 are not subjected to interference.

The third flat plate part 16 is connected to the second flat plate part 15 by the second linear stages 18 so as to be movable in the β-axis direction (the direction normal to the plane 114S and intersecting at right angles with the α-axis direction) with respect to the second flat plate part 15. The second linear stages 18 are driven by a control signal sent from the control unit 4. Since the second flat plate part 15 is movable in the a-axis direction with respect to the first flat plate part 14 as described above, the third flat plate part 16 is movable in the α-axis direction and the β-axis direction with respect to the first flat plate part 14. Since the second flat plate part 15 turns around the X axis and the Y axis integrally with the end face following part 11 as described above, the third flat plate part 16 connected to the second flat plate part 15 also turns integrally with the end face following part 11. Also, since the face following part 11 is pushingly moved in the horizontal direction, the third flat plate part 16 is also pushingly moved integrally with the end face following part 11. The third flat plate part 16 has through holes formed in portions through which the rod-shaped members 115 of the end face following part 11 pass. As described above, the third flat plate part 16 is made movable in the α-axis direction and the β-axis direction with respect to the first flat plate part 14 by the first linear stage 17 and the second linear stages 18. Therefore, the through hole has a size corresponding to the moving range of the third flat plate part 16 so that the movement in the α-axis direction and the β-axis direction of the third flat plate part 16 is not subjected to interference. Also, the third flat plate part 16 has a through hole formed in a portion through which the shaft part 32 of the pushingly moving mechanism 3, described later, passes. When the end face following part 11 turns around the X axis and the Y axis as described above, the third flat plate part 16 also turns integrally with the end face following part 11. Also, as described above, the third flat plate part 16 is made movable in the α-axis direction and the β-axis direction with respect to the first flat plate part 14 by the first linear stage 17 and the second linear stages 18. Therefore, the through hole (the through hole formed in the portion through which the shaft part 32 passes) has a size corresponding to the turning range and the moving range of the third flat plate part 16 so that the turn and the movement in the α-axis direction and the β-axis direction of the third flat plate part 16 are not subjected to interference.

By pushingly moving the end face following mechanism 1 having the above-described configuration toward the end face E of the pipe P and by causing it to butt against the end face E of the pipe P, in the case where the pipe P has been bent in the end portion thereof, the end face following mechanism 1 is turned following the end face E regardless of the direction of the bend.

C. Dimension Measuring Mechanism

As shown in FIG. 1 or FIGS. 2A and 2B, the dimension measuring mechanism 2 is configured so as to be pushingly moved integrally and be turnable with the end face following mechanism 1 and also to measure the dimensions (the seal diameter and the thread diameter) of the pipe P in the case where at least three contact sensors of the four contact sensors 114a to 114d detect that the end face following mechanism 1 butts against the end face E in the longitudinal direction of the pipe P. Specifically, the configuration is made such that the results of detection of the contact states using the four contact sensors 114a to 114d are transmitted to the control unit 4, and only in the case where at least three contact sensors detect that the end face following mechanism 1 butts against the end face E of the pipe P, the control unit 4 drivingly controls the dimension measuring mechanism 2. Also, as a preferred configuration, the dimension measuring mechanism 2 is configured so as to measure the dimensions of the pipe P in the case where the vibration detected by the vibration sensor 5 has a magnitude not greater than a predetermined magnitude. Specifically, the configuration is made such that the results of detection of the vibration using the vibration sensor 5 are sent to the control unit 4, and only in the case where the detected vibration has a magnitude not greater than a predetermined magnitude, the control unit 4 drivingly controls the dimension measuring mechanism 2. Hereunder, a further specific configuration of the dimension measuring mechanism 2 in accordance with this embodiment is explained.

The dimension measuring mechanism 2 in accordance with this embodiment includes a base part 21, seal diameter measuring contactors 22a, 22b, 22c and 22d, and thread diameter measuring contactors 23a, 23b, 23c and 23d.

C-1 Base Part

The base part 21 is fixedly connected to the third flat plate part 16 of the end face following mechanism 1. Since the third flat plate part 16 is movable in the α-axis direction and the β-axis direction with respect to the first flat plate part 14 as described above, the base part 21 fixedly connected to the third flat plate part 16 is also movable in the α-axis direction and the β-axis direction with respect to the first flat plate part 14. Also, since the third flat plate part 16 turns around the X axis and the Y axis integrally with the end face following part 11 as described above, the base part 21 also turns integrally with the end face following part 11. Further, since the third flat plate part 16 is pushingly moved integrally with the end face following part 11 as described above, the base part 21 is also pushingly moved integrally with the end face following part 11.

C-2 Seal Diameter Measuring Contactors and Thread Diameter Measuring Contactors

Figure 6A:
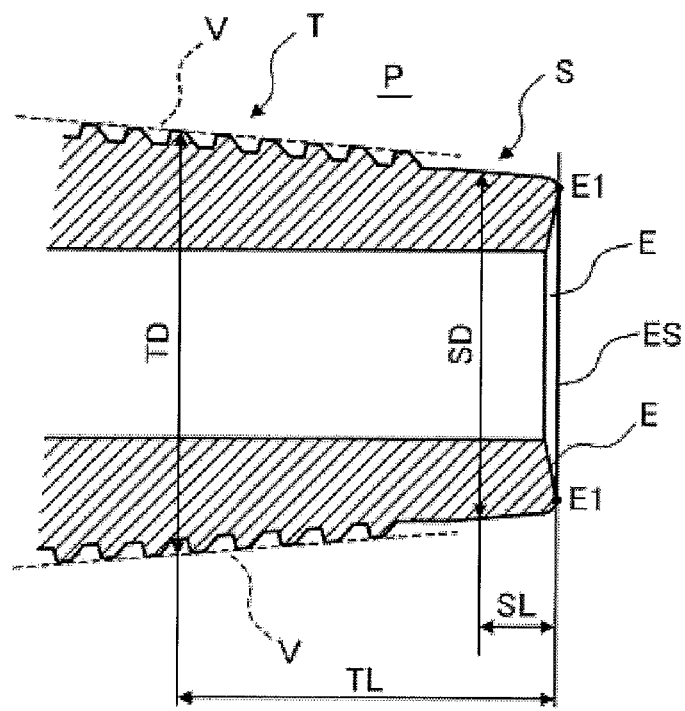
FIGS. 6A and 6B are explanatory views for explaining a seal diameter and a thread diameter.
Figure 6B:
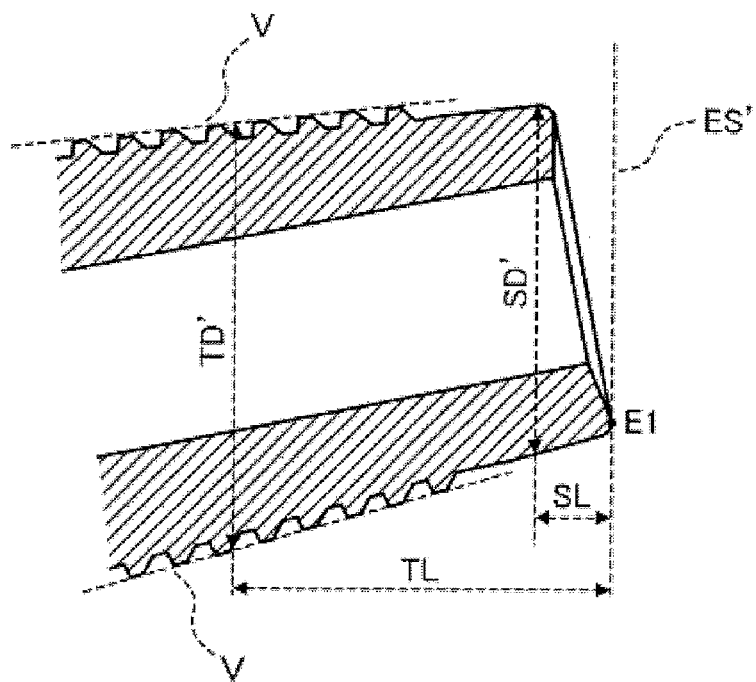

The seal diameter measuring contactors 22a to 22d are attached to the base part 21 so that the front end portions thereof are located at positions separate by a predefined distance SL (refer to FIGS. 6A and 6B) in the direction perpendicular to the contact plane 114S of the contact sensors 114a to 114d. The seal diameter measuring contactors 22a and 22c are attached to a uniaxial driving mechanism such as an air cylinder or a linear stage that is driven by a control signal sent from the control unit 4, and are configured so as to be capable of advancing and retreating in the α-axis direction with respect to the base part 21. Similarly, the seal diameter measuring contactors 22b and 22d are attached to a uniaxial driving mechanism such as an air cylinder or a linear stage that is driven by a control signal sent from the control unit 4, and are configured so as to be capable of advancing and retreating in the β-axis direction with respect to the base part 21. The displacement magnitudes in the α-axis direction of the seal diameter measuring contactors 22a and 22c and the displacement magnitudes in the β-axis direction of the seal diameter measuring contactors 22b and 22d can be measured by using a displacement magnitude measuring instrument such as a digital gauge attached to the respective uniaxial driving mechanisms.

The thread diameter measuring contactors 23a to 23d are attached to the base part 21 so that the front end portions thereof are located at positions separate by a predefined distance TL (refer to FIGS. 6A and 6B) in the direction perpendicular to the contact plane 1145 of the contact sensors 114a to 114d. The thread diameter measuring contactors 23a and 23c are attached to a uniaxial driving mechanism such as an air cylinder or a linear stage that is driven by a control signal sent from the control unit 4, and are configured so as to be capable of advancing and retreating in the α-axis direction with respect to the base part 21. Similarly, the thread diameter measuring contactors 23b and 23d are attached to a uniaxial driving mechanism such as an air cylinder or a linear stage that is driven by a control signal sent from the control unit 4, and are configured so as to be capable of advancing and retreating in the β-axis direction with respect to the base part 21. The displacement magnitudes in the cc-axis direction of the thread diameter measuring contactors 23a and 23c and the displacement magnitudes in the β-axis direction of the thread diameter measuring contactors 23b and 23d can be measured by using a displacement magnitude measuring instrument such as a digital gauge attached to the respective uniaxial driving mechanisms.

Since the base part 21 is movable in the α-axis direction and the β-axis direction with respect to the first flat plate part 14 as described above, the seal diameter measuring contactors 22a to 22d and the thread diameter measuring contactors 23a to 23d attached to the base part 21 are also movable in the α-axis direction and the β-axis direction with respect to the first flat plate part 14 with the movement of the base part 21. Further, as described above, the seal diameter measuring contactors 22a and 22c and the thread diameter measuring contactors 23a and 23c are movable in the α-axis direction with respect to the base part 21. The seal diameter measuring contactors 22b and 22d and the thread diameter measuring contactors 23b and 23d are movable in the β-axis direction with respect to the base part 21. Also, since the base part 21 turns around the X axis and the Y axis integrally with the end face following part 11 as described above, the seal diameter measuring contactors 22a to 22d and the thread diameter measuring contactors 23a to 23d also turn integrally with the end face following part 11. Further, since the base part 21 is pushingly moved integrally with the end face following part 11 as described above, the seal diameter measuring contactors 22a to 22d and the thread diameter measuring contactors 23a to 23d are also pushingly moved integrally with the end face following part 11.

C-3 Dimension Measuring Operation

Hereunder, dimension measuring operation using the dimension measuring mechanism 2 having the above-described configuration is explained by referring to FIGS. 3A to 3D as appropriate. Seal diameter measuring operation using the seal diameter measuring contactors 22a to 22d and thread diameter measuring operation using the thread diameter measuring contactors 23a to 23d are the same operation, so that herein is explained only the thread diameter measuring operation using the thread diameter measuring contactors 23a to 23d.

Figure 3A:
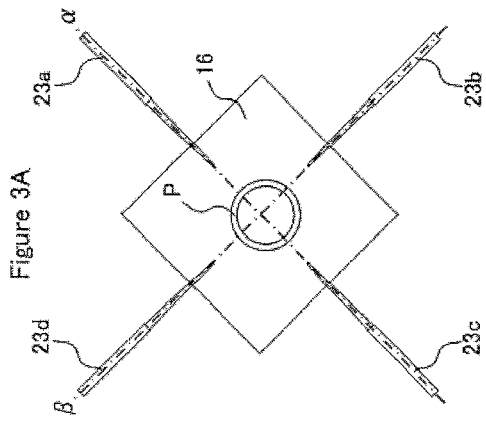
FIGS. 3A to 3D are explanatory views for explaining dimension measuring operation using the dimension measuring device shown in FIG. 1.
Figure 3B:
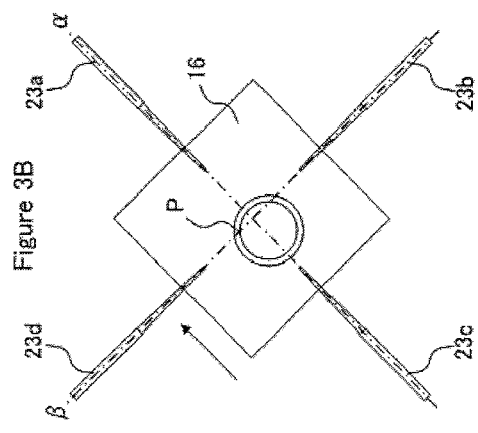

First, from the initial state (FIG. 3A) immediately after the end face following mechanism 1 is pushingly moved toward the end face E of the pipe P by the pushingly moving mechanism 3, described later, to be butted against the end face E of the pipe P, the third flat plate part 16 is moved in the α-axis direction through an appropriate distance (FIG. 3B). Specifically, the second flat plate part 15 is moved in the α-axis direction through an appropriate distance by driving the first linear stage 17 by means of a control signal sent from the control unit 4. Thereby, the third flat plate part 16 connected to the second flat plate part 15 is also moved in the α-axis direction integrally with the second flat plate part 15. Also, the thread diameter measuring contactors 23a to 23d connected to the third flat plate part 16 via the base part 21 are moved in the α-axis direction integrally with the third flat plate part 16.

Figure 3C:
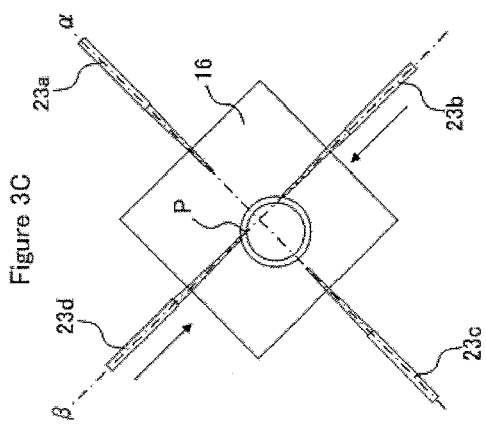

Next, the uniaxial driving mechanism to which the thread diameter measuring contactors 23b and 23d are attached is driven by means of a control signal sent from the control unit 4, whereby the thread diameter measuring contactors 23b and 23d are moved in the β-axis direction, and the front end portions thereof are butted against the thread part of the pipe P (FIG. 3C). At this time, the displacement magnitudes in the β-axis direction of the thread diameter measuring contactors 23b and 23d during the time from the initial state (FIG. 3A) to the state in which the front end portions of the contactors butt against the thread part of the pipe P (FIG. 3C) are measured by the displacement magnitude measuring instrument attached to the uniaxial driving mechanism.

Figure 3D:
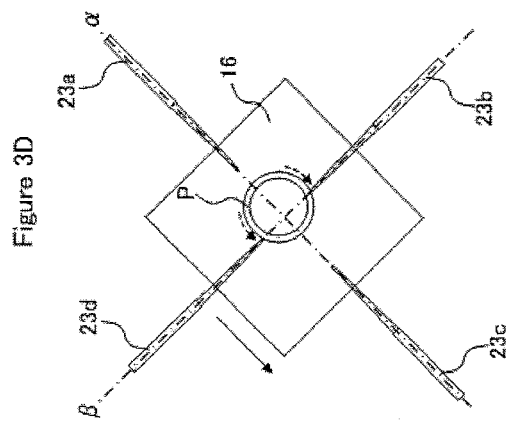
Figure 4:
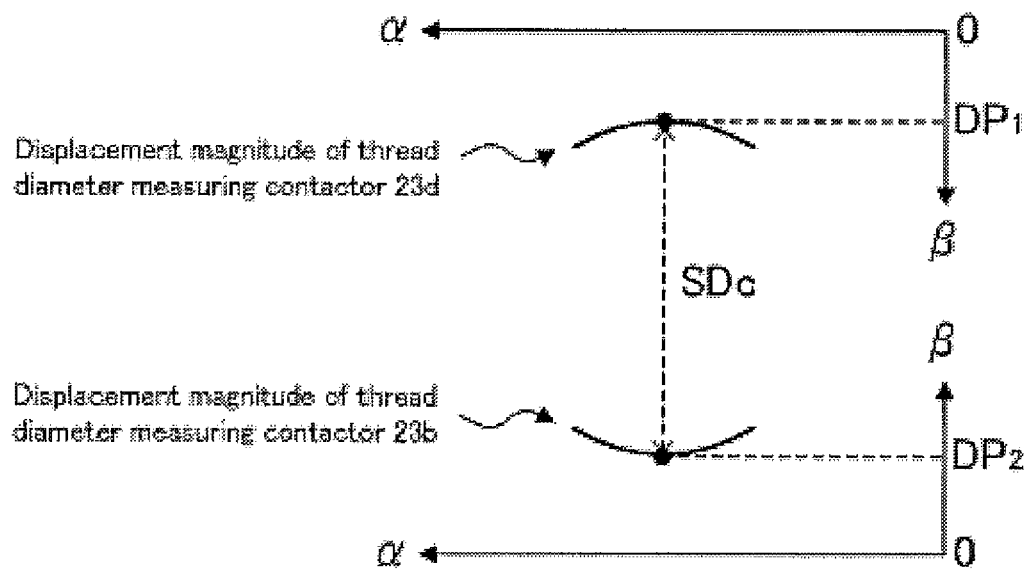
FIG. 4 is an explanatory view for explaining a method for calculating dimensions using the dimension measuring device shown in FIG. 1.

Next, while the third flat plate part 16 is moved in the α-axis direction (in the direction reverse to the direction shown in FIG. 3B) through an appropriate distance, the thread diameter measuring contactors 23b and 23d are moved in the β-axis direction so that a state in which the front end portions thereof butt against the thread part of the pipe P is formed (FIG. 3D). At this time as well, as described above, the displacement magnitudes in the β-axis direction of the thread diameter measuring contactors 23b and 23d are measured by the displacement magnitude measuring instrument attached to the uniaxial driving mechanism.

The displacement magnitudes in the β-axis direction of the thread diameter measuring contactors 23b and 23d measured successively in the process in which the third flat plate part 16 moves in the α-axis direction as described above are transmitted to the control unit 4. The control unit 4 calculates a thread diameter SDc in the β-axis direction based on the peak values $DP_1$ and $DP_2$ of the distribution (the distribution in the α-axis direction) of displacement magnitudes in the β-axis direction of the thread diameter measuring contactors 23b and 23d and the separation distance in the β-axis direction of the thread diameter measuring contactors 23b and 23d in the initial state (FIG. 3A) stored beforehand. Further specifically, taking the separation distance in the β-axis direction of the thread diameter measuring contactors 23b and 23d in the initial state as D, the thread diameter SDc in the β-axis direction is calculated, for example, by Formula (1).

$$SD_C = D - (DP_1 + DP_2) \quad (1)$$

The same operations as the series of operations described above are also accomplished for the thread diameter measuring contactors 23a and 23c, whereby the thread diameter in the α-axis direction is calculated.

Figure 5:
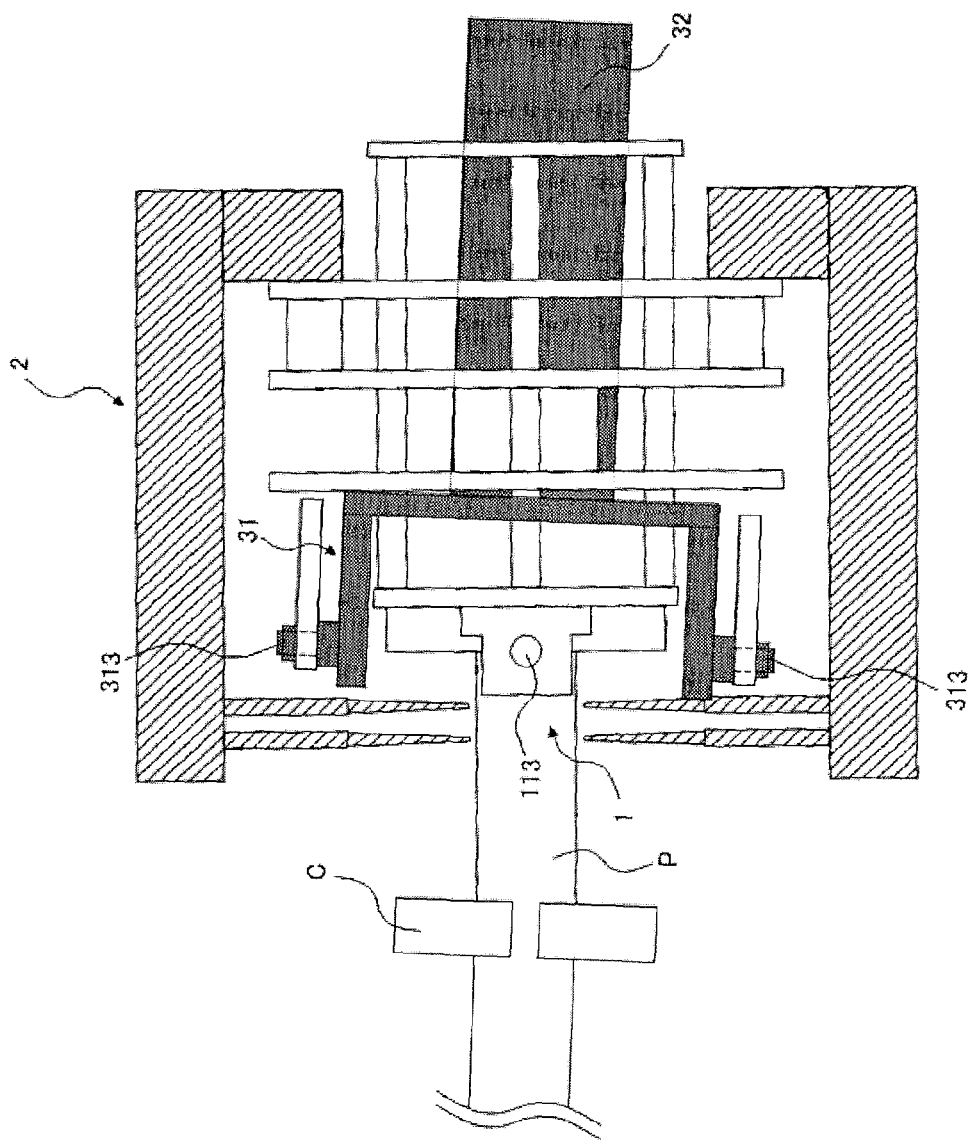
FIG. 5 is a side view showing a turning state of the end face following mechanism and the dimension measuring mechanism shown in FIGS. 2A and 2B.

The dimension measuring mechanism 2 having the above-described configuration is pushingly moved integrally and turns integrally with the end face following mechanism 1 according to the direction and position of the reference plane of the pipe P as shown in FIG. 5, so that the dimensions at the predetermined positions in the direction perpendicular to the reference plane of the pipe P can be measured automatically with high accuracy. FIG. 5 shows a state in which since the end portion of the pipe P bends to the vertical direction, the end face following mechanism 1 and the dimension measuring mechanism 2 are turned around the X axis (around the shaft members 113) by following the end face of the pipe P. In the case where the end portion of the pipe P bends to the horizontal direction, the end face following mechanism 1 and the dimension measuring mechanism 2 are turned around the Y axis (around the shaft members 313) by following the end face of the pipe P. Also, in the case where the end portion of the pipe P bends to both of the vertical direction and the horizontal direction, the end face following mechanism 1 and the dimension measuring mechanism 2 are turned around the X axis (around the shaft members 113) and around the Y axis (around the shaft members 313) by following the end face of the pipe P.

D. Pushingly Moving Mechanism

As shown in FIG. 1 or FIGS. 2A and 2B, the pushingly moving mechanism 3 pushingly moves the end face following mechanism 1 in the horizontal direction (in the Z-axis direction in the state shown in FIG. 1) into a state in which at least three contact sensors of the four contact sensors 114a to 114d detect that the end face following mechanism 1 butts against the end face E in the longitudinal direction of the pipe P. Specifically, results of detection of the contact states using the four contact sensors 114a to 114d are transmitted to the control unit 4, and the control unit 4 drivingly controls the pushingly moving mechanism 3 to move the end face following mechanism 1 horizontally into a state in which at least three contact sensors detect that the end face following mechanism 1 butts against the end face E of the pipe P. Hereunder, a further specific configuration of the pushingly moving mechanism 3 in accordance with this embodiment is explained.

The pushingly moving mechanism 3 in accordance with this embodiment includes the support part 31, the shaft part 32, a carriage part 33, and a driving part 34.

D-1 Support Part and Shaft Part

The support part 31 includes a flat plate member 311, a pair of projecting members 312 provided so as to project in the Z-axis direction from both end portions in the Y-axis direction of the flat plate member 311, and the pair of shaft members 313 that connect the pair of projecting members 312 to the cylindrical part 12. As described above, the support part 31 is connected to the cylindrical part 12 by the pair of shaft members 313 so as to be turnable around the Y axis. Specifically, the pair of projecting members 312 are connected to the cylindrical part 12 via the pair of shaft members 313 so as to be turnable around the Y axis.

The support part 31 is fixedly connected to the shaft part 32, and the support part 31 and the shaft part 32 are configured so as not to turn even if the end face following mechanism 1 and the dimension measuring mechanism 2 turn around the X axis and the Y axis (refer to FIG. 5). The support part 31 is pushingly moved in the horizontal direction by the shaft part 32, whereby the cylindrical part 12 connected to the support part 31 is pushingly moved in the horizontal direction, and the end face following part 11 connected to the cylindrical part 12 is also pushingly moved in the horizontal direction. The flat plate member 311 has through holes formed in portions through which the rod-shaped members 115 of the end face following part 11 pass. When the contact sensors 114a to 114d turn around the X axis and the Y axis according to the direction of the reference plane of the pipe P as described above, the rod-shaped members 115 also turn integrally with the contact sensors 114a to 114d. Therefore, each of the through holes has a size corresponding to the turning range of the rod-shaped members 115 so that the turning of the rod-shaped members 115 is not subjected to interference.

D-2 Pushingly Moving Mechanism and Other Configurations

The shaft part 32 is connected fixedly to the carriage part 33, or is connected to the carriage part 33 via a uniaxial driving mechanism such as an air cylinder or a linear stage as necessary. The uniaxial driving mechanism is provided in the case where the shaft part 32 and the support part 31 must be moved up and down in the vertical direction with respect to the carriage part 33.

The carriage part 33 is mounted with the driving part 34 configured by an air cylinder or the like for pushingly moving the carriage part 33 in the horizontal direction. The driving part 34 is driven by a control signal sent from the control unit 4, whereby the carriage part 33 is pushingly moved in the horizontal direction, and the shaft part 32 connected to the carriage part 33 and the support part 31 connected to the shaft part 32 are also pushingly moved in the horizontal direction.

As a preferred configuration, the pushingly moving mechanism 3 in accordance with this embodiment is configured so as to be capable of regulating a pushingly moving force for pushingly moving the end face following mechanism 1. Specifically, the pressure of the air cylinder constituting the driving part 34 is measured by an appropriate sensor, and this pressure measured value is transmitted to the control unit 4.

The control unit 4 drivingly controls the driving part 34 so that the pushingly moving force calculated from the pressure measured value takes a preset value.

The pushing movement of the end face following mechanism 1 using the pushingly moving mechanism 3 having the above-described configuration is not limited to a stage before the dimensions of the pipe P are measured by the dimension measuring mechanism 2 (a stage at which the end face following mechanism 1 is transferred from a state of being not butted against the end face of the pipe P to a state of being butted against the end face of the pipe P), but is continued during the dimensional measurement. Therefore, the dimensions of the pipe P can be measured while the state in which the end face following mechanism 1 butts against the end face of the pipe P is maintained stably.

In this embodiment, the vibration sensor 5 is mounted in the carriage part 33 of the pushingly moving mechanism 3. However, the configuration is not limited to this one. A configuration can be adopted such that the vibration sensor 5 is mounted in any other part of the pushingly moving mechanism 3 or mounted to the end face following mechanism 1 or the dimension measuring mechanism 2.

EXAMPLES

Hereunder, by showing examples and comparative examples, the features of the present invention are clarified further.

Example 1

The seal diameter and the thread diameter of the pin joint formed in the end portion of the pipe P were measured by using the dimension measuring device 100 the general configuration of which is shown in FIG. 1 and FIGS. 2A and 2B. The pipe P to be measured had an outside diameter of 73.0 mm, a wall thickness of 5.51 mm, and a length of 9500 mm. A portion about 500 mm distant from the end face of the pipe P was restrained by the chuck member C, and the axial direction of the restrained portion of the pipe P was made approximately parallel to the pushingly moving direction of the end face following part 11. The bend amount of the end portion of the pipe P (=a shift amount of the cross section center of the pipe P/a length of the shift amount measuring portion) was 1.2 mm/1000 mm at a maximum in the β-axis direction. The measurement position of seal diameter (distance SL, refer to FIGS. 6A and 6B) was 1.9 mm distant from the reference plane, and the measurement position of thread diameter (distance TL, refer to FIGS. 6A and 6B) was 19.0 mm distant from the reference plane. Also, the seal diameter and the thread diameter of the same pipe P as described above were measured manually by using a special-purpose measuring instrument. The difference between the seal diameter and thread diameter measured by using the dimension measuring device 100 and the seal diameter and thread diameter measured manually by using the special-purpose measuring instrument was used as an evaluation result.

Comparative Example 1

The seal diameter and the thread diameter of the pin joint formed in the end portion of the pipe P were measured under the same conditions as those of example 1 except that the conditions described below were different. The difference between the seal diameter and thread diameter measured as described above and the seal diameter and thread diameter measured manually by using the special-purpose measuring instrument was used as an evaluation result. In the dimension measuring device 100 that is the same as that used in example 1, the end face following mechanism 1 was fixed so as not to be turned in the state in which the direction normal to the plane 114S of the end face following part 11 was approximately parallel to the pushingly moving direction of the end face following part 11 (the state shown in FIG. 1). By using the dimension measuring device 100 in which the end face following mechanism 1 does not turn, the seal diameter and the thread diameter of the pin joint formed in the end portion of the pipe P were measured. The difference between the seal diameter and thread diameter measured by using the dimension measuring device 100 in which the end face following mechanism 1 does not turn and the seal diameter and thread diameter measured manually by using the special-purpose measuring instrument was used as an evaluation result.

Example 2

The seal diameter and the thread diameter of the pin joint formed in the end portion of the pipe P were measured under the same conditions as those of example 1 except that the bend amount of the end portion of the pipe P to be measured was 2.1 mm/1000 mm at a maximum in the α-axis direction. The difference between the seal diameter and thread diameter measured as described above and the seal diameter and thread diameter measured manually by using the special-purpose measuring instrument was used as an evaluation result.

Comparative Example 2

The seal diameter and the thread diameter of the pin joint formed in the end portion of the pipe P were measured under the same conditions as those of comparative example 1 except that the bend amount of the end portion of the pipe P to be measured was 2.1 mm/1000 mm at a maximum in the α-axis direction. The difference between the seal diameter and thread diameter measured as described above and the seal diameter and thread diameter measured manually by using the special-purpose measuring instrument was used as an evaluation result.

Example 3

The seal diameter and the thread diameter of the pin joint formed in the end portion of the pipe P were measured under the same conditions as those of example 1 except that the bend amount of the end portion of the pipe P to be measured was 2.8 mm/1000 mm at a maximum in the β-axis direction. The difference between the seal diameter and thread diameter measured as described above and the seal diameter and thread diameter measured manually by using the special-purpose measuring instrument was used as an evaluation result.

Comparative Example 3

The seal diameter and the thread diameter of the pin joint formed in the end portion of the pipe P were measured under the same conditions as those of comparative example 1 except that the bend amount of the end portion of the pipe P to be measured was 2.8 mm/1000 mm at a maximum in the β-axis direction. The difference between the seal diameter and thread diameter measured as described above and the seal diameter and thread diameter measured manually by using the special-purpose measuring instrument was used as an evaluation result.

Evaluation Results

The evaluation results of examples 1 to 3 and comparative examples 1 to 3 described above are given in Table 1. The unit of the numerical value shown in Table 1 is μm.

TABLE 1

|  | Bend of pipe | Seal diameter (α axis) | Seal diameter (β axis) | Thread diameter (α axis) | Thread diameter (β axis) |
| --- | --- | --- | --- | --- | --- |
| Example 1 | Bend amount: 1.2 mm/1000 mm | −0.95 | −0.51 | −0.84 | −0.20 |
| Comparative example 1 | Bend direction: β-axis direction | −1.17 | 1.07 | −1.08 | 2.55 |
| Example 2 | Bend amount: 2.1 mm/1000 mm | −0.30 | −0.17 | 0.42 | 0.07 |
| Comparative example 2 | Bend direction: α-axis direction | 4.79 | −0.55 | 7.93 | 0.44 |
| Example 3 | Bend amount: 2.8 mm/1000 mm | −0.52 | 0.69 | 0.67 | −1.29 |
| Comparative example 3 | Bend direction: β-axis direction | 0.14 | 10.71 | 0.07 | 9.28 |

Table 1 reveals that, in comparative examples 1 to 3, at least any one evaluation result (the evaluation result hatched in Table 1) of the evaluation results of the seal diameter in the α-axis direction, the seal diameter in the (3-axis direction, the thread diameter in the α-axis direction, and the thread diameter in the β-axis direction is large. That is, it is found that the difference between the measured value obtained by using the dimension measuring device and the measured value obtained manually by using the special-purpose measuring instrument is large. Table 1 also reveals that, in contrast, in examples 1 to 3, all of the evaluation results of the seal diameter in the α-axis direction, the seal diameter in the β-axis direction, the thread diameter in the α-axis direction, and the thread diameter in the β-axis direction are small. That is, it is found that the difference between the measured value obtained by using the dimension measuring device and the measured value obtained manually by using the special-purpose measuring instrument is small. According to the dimension measuring device in accordance with the present invention, it can be said that even if the pipe has been bent in the end portion thereof, the seal diameter and the thread diameter can be measured with the same level of accuracy as that of the manual measurement using the special-purpose measuring instrument.

The invention claimed is:

1. A dimension measuring device for a long material, comprising:
   an end face following mechanism which butts against the end face in the longitudinal direction of the long material;
   a dimension measuring mechanism which is connected to the end face following mechanism to measure the dimension of the long material; and
   a pushingly moving mechanism for pushingly moving the end face following mechanism toward the end face in the longitudinal direction of the long material, wherein
   the end face following mechanism includes a plurality of (three or more) contact sensors, which are arranged along one plane to detect a contact state, on the side where the end face following mechanism butts against the end face in the longitudinal direction of the long material, and is turnable around at least two axes intersecting at right angles with the direction normal to the plane and intersecting at right angles with each other;
   the pushingly moving mechanism pushingly moves the end face following mechanism into the state in which at least three contact sensors of the plurality of contact sensors detect that the end face following mechanism butts against the end face in the longitudinal direction of the long material; and
   the dimension measuring mechanism is pushingly moved integrally and is turnable integrally with the end face following mechanism, and measures the dimension of the long material when it is detected, by at least three contact sensors of the plurality of contact sensors, that the end face following mechanism butts against the end face in the longitudinal direction of the long material.

2. The dimension measuring device for a long material according to claim 1, wherein the contact sensor includes a pair of electrodes, and a contact state is detected by the presence or absence of a current flowing between the pair of electrodes.

3. The dimension measuring device for a long material according to claim 1, wherein the pushingly moving mechanism can regulate a pushingly moving force for pushingly moving the end face following mechanism.

4. The dimension measuring device for a long material according to claim 1, wherein
   at least one mechanism of the end face following mechanism, the dimension measuring mechanism, and the pushingly moving mechanism includes a vibration sensor for detecting a vibrating state; and
   the dimension measuring mechanism measures the dimension of the long material in the case where the vibration detected by the vibration sensor has a magnitude not greater than a predetermined magnitude.

* * * * *